United States Patent [19]

Ecord et al.

[11] 4,358,480
[45] Nov. 9, 1982

[54] METHOD OF REPAIRING SURFACE DAMAGE TO POROUS REFRACTORY SUBSTRATES

[75] Inventors: Glenn M. Ecord; Calvin Schomburg, both of Houston, Tex.

[73] Assignee: The United States of America as represented by the Administrator of the National Aeronautics and Space Administration, Washington, D.C.

[21] Appl. No.: 266,254

[22] Filed: May 22, 1981

[51] Int. Cl.³ .................. B32B 35/00; B05D 3/02; B05D 3/12; B32B 3/26
[52] U.S. Cl. .................. 427/140; 244/158 A; 427/292; 427/379; 427/384; 427/387; 427/302; 428/63
[58] Field of Search ............ 427/140, 397.7, 402, 427/379, 292, 384, 387; 428/49, 218, 446, 447, 63; 244/158 A

[56] References Cited

U.S. PATENT DOCUMENTS 4,093,771 6/1978 Fletcher .................. 427/379 X
4,124,732 11/1978 Leger .................... 428/77

OTHER PUBLICATIONS

Berger, Dean M., *Alkyl & Polyol Silicate Zinc-Rich Primers,* Apr. 1979.

*Primary Examiner*—Michael R. Lusignan
*Attorney, Agent, or Firm*—Russell E. Schlorff; John R. Manning; Marvin F. Matthews

[57] ABSTRACT

A method of repairing damage to a porous refractory material coated with a glass coating (16) comprising applying hydrolyzed tetraethyl orthosilicate to the damaged area, curing said tetraethyl orthosilicate, applying to said damaged area a pliable filler (30) comprised of hydrolyzed tetraethyl orthosilicate and powdered refractory substrate (11) and heating the damaged area to cure filler (30).

15 Claims, 5 Drawing Figures

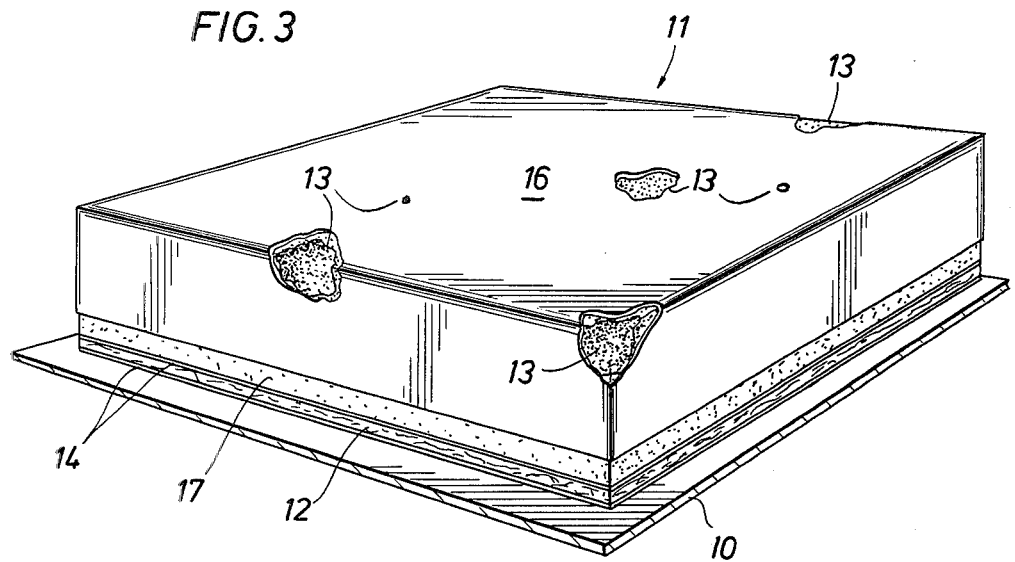
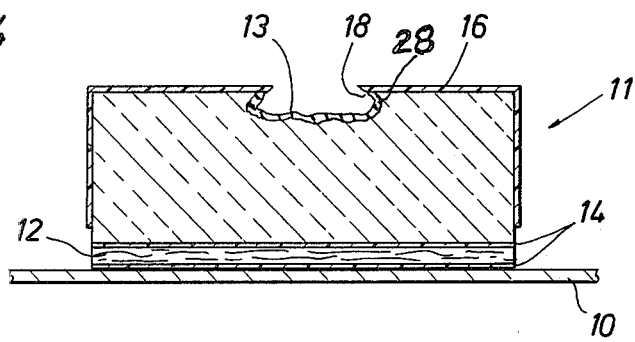
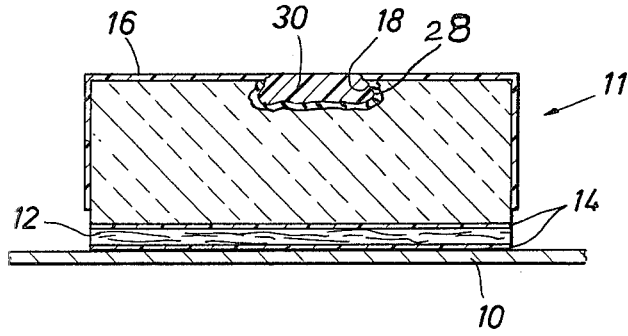

METHOD OF REPAIRING SURFACE DAMAGE TO POROUS REFRACTORY SUBSTRATES

DESCRIPTION

Origin of the Invention

The invention described herein was made by employees of the United States Government and may be manufactured and used by or for the Government of the United States of America for governmental purposes without the payment of any royalties thereon or therefor.

RELATED APPLICATION

The application is related to U.S. Ser. No. 217,336, filed Dec. 17, 1980 and entitled "Attachment System For Silica Tiles" and to an application entitled "Densification Of Porous Refractory Substrates", filed contemporaneously herewith and now U.S. Pat. No. 4,338,368, patented July 6, 1982.

BACKGROUND OF THE INVENTION

The present invention relates to a method for repairing a porous refractory material and, more particularly, to a method of repairing surface damage to a refractory material which is coated with a glass coating.

Portions of the space shuttle orbiter, which is subject to temperatures ranging from $-250°$ F. to $2300°$ F., utilize tiles formed of substantially chemically pure silica fibers which are rigidized with a high purity silica binder. The tiles, known as L1-900, are manufactured by Lockheed Missles and Space Company, Inc., have a density of about 9 pounds per cubic foot, relatively low strength, extremely high temperature resistance, and an extremely low coefficient of thermal expansion as compared to metals. The tiles, because they are porous, have a tendency to act as a sponge in terms of absorbing water and, moreover, do not possess requisite optical properties either in terms of being optically absorbent or reflective depending on their point of attachment to the space shuttle orbiter. To waterproof the tiles, impart the necessary optical properties and facilitate handling of the tiles to avoid damage, the tiles are coated with a relatively thin glass like coating. The glass like coating, which is generally a borosilicate glass, is itself very susceptible to damage.

Surface damage to the tiles can cause serious problems when the space shuttle orbiter is in flight. Loss of the engine coating results in a loss of optical properties which interferes with proper heat emittance. Accordingly, the temperature may rise excessively, i.e. above $2300°$ F., causing burn through of the tile to the metallic understructure and of course burn through of the understructure. Additionally, surface damage to the glass coating and the tile creates turbulent, non-streamline air flow resulting in cavitation in the damaged area with the result that the tile will be subjected to forces which can physically tear it apart. This can ultimately result not only in loss of the tile which has been damaged but may result in peeling off of adjacent tiles with a result that the metallic understructure of the orbiter would then be exposed to destructive temperatures. Since the individual tiles are contoured and fitted, it is not practical to simply replace the damaged tile with a new tile. Accordingly, it is necessary to have a method by which the damaged tile can be repaired and returned to its original integrity prior to flight.

U.S. Pat. No. 2,791,262 discloses a process for improving the physical characteristics of sheet form which includes the steps of forming a mixture of mica pulp and hydrolyzed ethyl silicate, forming a sheet from the above mixture and heating the formed sheet. U.S. Pat. No. 4,093,771 discloses the use of silicon tetraboride in glass coatings used on silica tiles. Neither of the above patents, nor U.S. Pat. No. 4,124,732 which discloses the system for attaching the ceramic tiles to the orbiter spacecraft, and which are the closest prior art known to applicants, teach a technique for effecting repair to a porous refractory substrate coated with a glass coating which restores the damaged tile to its original integrity.

SUMMARY OF THE INVENTION

It is therefore an object of the present invention to provide a method for repairing damage to a porous refractory substrate coated with a glass coating.

Another object of the present invention is to provide a repair technique for the thermal protection system used on a spacecraft such as the NASA Space Shuttle Orbiter.

The above and other objects of the present invention will become apparent from the description given herein and the appended claim.

In the method of the present invention, the damaged area of a porous refractory substrate is coated with hydrolyzed tetraethyl orthosilicate (TEOS), the TEOS being dried and cured sufficiently to release a form of silica which bonds to the refractory substrate. A pliable filler comprised of hydrolyzed TEOS and powdered refractory substrate is then applied to the damaged area in a suitable fashion to fill the damaged area after which the filler is cured. In cases where an optically absorptive surface is necessary, i.e., a darkened surface, the filler may contain a refractory pigmenting agent such as silicon tetraboride powder.

BRIEF DESCRIPTION OF THE DRAWINGS

FIG. 3 is a simplified pictorial representation illustrating how the insulating tile is attached to the structure of the space shuttle.

FIG. 4 is a partial cross sectional view showing a damaged area on one of the tiles.

FIG. 5 is a view similar to FIG. 4 showing the damaged area repaired according to the method of the present invention.

DESCRIPTION OF THE PREFERRED EMBODIMENTS

Figure 1:
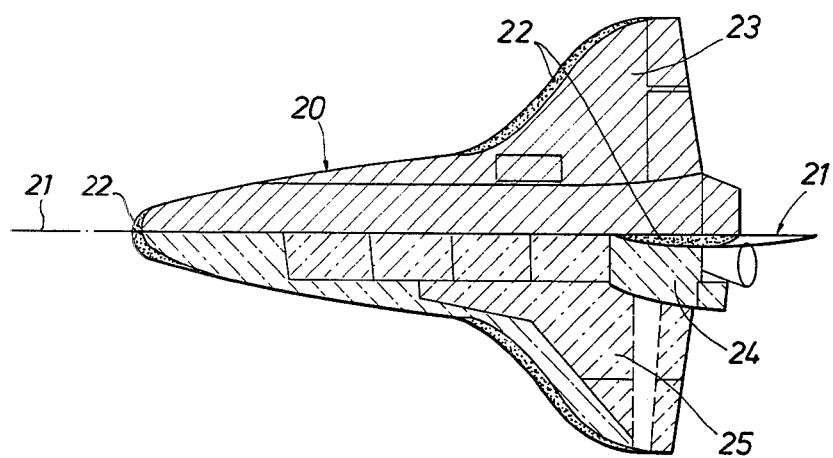
FIG. 1 is a plan view of a space shuttle orbiter showing the thermal protection system.
Figure 2:
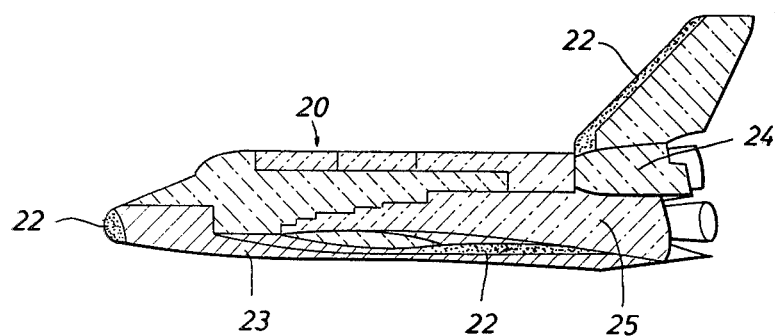
FIG. 2 is a side view of the oribiter shown in FIG. 1.

Referring first to FIG. 1, an orbiter vehicle 20 is illustrated, the portion of the vehicle above the horizontal line 21 representing the lower surface of the vehicle and the portion of the vehicle below the horizontal line 21 representing the upper surface of the vehicle. The line 21 represents a vertical plane through the vehicle. In FIG. 2, a side view of the vehicle is illustrated. The orbiter 20 is shaded in four areas with the dotted area representing a coated reinforced carbon-carbon insulation area 22, the line shaded area representing a high temperature re-usable surface insulation area 23, a first line-dot-line shading representing a low temperature re-usable surface insulation area 24 and a second line-dot-line shading representing a flexible or re-usable surface insulation area 25. The area 22 on the nose cap and leading edges of the wings is capable of withstanding the effects of temperature in excess of 2300° F. The area 23 which is most of the lower surface will withstand the effects of surface temperature in the range of 1200° F. to 2300° F. The area 24 which includes the side surfaces of the tail and the forward top and sides of the vehicle will withstand the effects of surface temperature in the range of 700° F. to 1200° F. The area 25 which is the upper surface of the wings, the top and rearward sides of the vehicle will withstand the effects of surface temperatures up to 900° F. With the exception of area 22 on the nose cap and leading edges of the wings, the high temperature areas are protected by re-usable surface insulation (RSI) tiles such as the L1-900 tiles discussed above. As noted, remaining portions of the top side of the vehicle, wings and fuselage, may reach temperatures approaching 1200° F. and are protected by a silica insulation and organic material with sufficient thermal stability. The tiles are formed of 99.7% pure silica fibers 1 to 10 microns thick. The fibers are rigidized into a solid block by ceramic bonding. For example, a slurry containing fibers mixed in water may be flame cast to form soft, porous blocks to which colloidal silica binder is added. When the porous blocks are sintered at 2400° F., a rigid block is produced which is cut and machined to the precise dimensions to form the individual tile. Ninety percent of the tile is formed of voids and 10% fibers thereby permitting lightweight tiles to be formed. Depending upon the location on the vehicle, the tiles are provided with glass coatings exhibiting varying optical properties. Thus, the coatings may be either a darkened surface to be optically absorbing or a white surface so as to be optically reflective. Additionally, the tiles are usually treated with a silane impregnating agent to provide waterproofing.

Referring now to FIG. 3 there may be seen a pictorial representation of the system of attaching the high purity silica tiles to the metallic outer surface 10 (aluminum alloy) of the vehicle. The tiles, shown generally as 11, are approximately 6×6 inches, with varying thickness depending upon specific vehicle location and heat load. Accordingly, it will be apparent from FIG. 3 that the tiles 11 form a thermal shield over the surface 10. Furthermore, it will be apparent from consideration of the structure depicted in FIG. 3 that tiles 11 will be subject to damaging structural stresses arising because of the difference in coefficient of thermal expansion between the metal 10 of the vehicle and the material from which the tiles 11 are fabricated, as well as deflections of the structure due to mechanical (both aerodynamic and internal pressure) loads unless such loads are isolated. Accordingly, in attaching each of the tiles 11 to the metallic surface 10 an intermediate layer of material, such as a felt pad 12, is interposed to act as a strain isolater. Although the temperature during re-entry may be 2300° F., the effective temperature for strain isolator pad 12 will be 500° F. due to the insulating characteristics of the tile. To attach tile 11 to pad 12 and pad 12 to the outer aluminum surface 10 of the shuttle orbiter, thin layers 14 (generally less than 10 mils.) of a silicone adhesive are utilized. A suitable adhesive are methylphenyl silicone (RTV 560 manufactured by the General Electric Company). As can be seen with reference to FIG. 3, tile 11 is coated with a borosilicate glass coating 16 which extends over the outer surface and sides of tiles 11 but which leaves exposed a peripheral rim 17 of the rigidized fibrous block of tile 11. The glass coating is more fully described in U.S. Pat. No. 4,093,771, incorporated herein by reference for all purposes. The coating and refractory material are very delicate and damage ranging from pin size to approximately 1 square inch occurs due to handling and installation and testing of the tiles. Over 10,000 areas requiring repair have occurred on space shuttle orbiter tiles. The construction and precise method of attachment of the various components shown in FIG. 3 is more fully described in U.S. Pat. No. 4,124,732, incorporated herein by reference for all purposes. FIG. 3 also shows how the tiles may be damaged, the damaged areas being designated as 13. The damaged area 13, is a portion of the tile in which the glass coating 16 and a portion of the rigidized fibrous blocks may be broken away. As mentioned, the damage may be as small as a pin prick or may be over an inch in diameter. As to depth, the damage may affect only the coating 16, with the tile material untouched, or may extend approximately an inch in depth.

It will be apparent that damaged areas 13 will at a minimum have a possible portent on the optical profile during orbit and if substantial produce a negative thermal gradient during reentry. In a severe case of damage, there can be burn through of tile 11, adhesive layers 14, strain isolation pad 12, and ultimately burn through of the metallic surface 10 of the spacecraft. In critical locations damage can result in loss of tiles followed by structural failure. Therefore, it is essential that the integrity of the thermal protection system be preserved. Replacement of all damaged tiles with new tiles would result in significant additional costs and add to the complexity of refurbishment of the space shuttle between missions.

Past attempts at tile repair were generally unsuccessful, primarily due to poor capability of the repairs to remain in place when tested under the severe dynamic conditions associated with a Space Shuttle flight. The tile material (fine, high purity silica fibers) has a very low density (9 lb./ft$^3$) and does not provide a substantial base for support or retention of repairs. In addition, a repair material having thermal expansion characteristics different than the tile material could loosen during thermal cycling. Further, the extremely small pore size and waterproofing of the tiles contributed to penetration resistance. It was necessary, therefore, to develop a unique high temperature repair system utilizing filler material similar to the tile material in composition and purity with a mechanism for achieving a strong filler/tile bond.

Referring now to FIGS. 4 and 5 there may be seen a simplified functional representation of the manner in which a damaged tile 11 is repaired. According to the repair method of the present invention, the damaged area 13 is preferably undercut around its periphery, as shown at 18. This "dovetailing" of the damaged area 13, while not absolutely necessary, aids in assuring that the filler used to repair damaged area 13 will be more securely locked in the cavity. All loose particles are removed from the cavity.

Hydrolyzed tetraethyl orthosilicate (TEOS) is applied to all of the exposed surfaces of damaged area 13 in a uniform, even coating. The TEOS penetrates the fibrous material to a depth of approximately 1/10 inch, see FIGS. 4 and 5. The hydrolyzed TEOS is then cured, preferably at 275°±15° F. for approximately one to five minutes. This results in a strengthened base for the support and retention of the repair. In effect the penetrated area 28 is densified. Once the hydrolyzed TEOS application has cured, the damaged area is again wetted with hydrolyzed TEOS to provide a fresh adhesive surface. Following this application of TEOS a paste filler 30 comprised of liquid TEOS and a powder comprised of suitable refractory substrate is applied to the damaged area. The filler 30 is worked into the cavity of damaged area 13 is built to a level consistent with the original mold line of the tile which in this case would be the surface of the borosilicate glass coating 16. The filled area is then dried at approximately 120° F.±15° F. for approximately 5 minutes. Any filler material 30 which extends above the surface of the borosilicate glass coating 16 can be sanded off after curing. A coating of hydrolized TEOS may be applied to the required surface followed by curing at 275° F.±15° F. for about one minute to add additional adhesive properties. After curing, a coat of waterproofing silane agent (hexamethyldisilazane, such as, Dow Z-6079) is applied over the repaired surface.

The paste filler 30 will generally comprise at least 60% by weight of the powdered refractory substrate (which in the case of LI-900 tiles may be silica fibers scraped from a rejected tile) and sufficient hydrolyzed TEOS to ensure that the paste filler will not run or sag under gravitational force. In general, the filler should be made as dry as possible while retaining the ability to hold together and stay in place in the repair procedure. In cases where the tile is pigmented to achieve proper optical properties, the filler can include a refractory pigment, such as, for example, silicon tetraboride (for black tiles). When such a pigment is used, and especially in the case of silicon tetraboride, it will be present in an amount of up to about 10% by weight.

If the silicon tetraboride is omitted from the filler composition, the filler is white and accordingly can be used to repair the white tiles used on the orbiter. Laboratory tests have shown that the white repair has the same tenacity and thermal stability under radiant exposure as the blade (pigmented) repair.

The TEOS which is used in the repair procedure of the present invention has the formula $(C_2H_5)_4SiO_4$ and is hydrolyzed in aqueous mediums such as acidified water to release an adhesive type silica which deposits in the voids of the refractory substrate and is believed to attach at the fiber intersections of the refractory substrate. A particularly desirable form of TEOS which has been used in the method of the present invention is known as Silbond, ethyl silicate Condensed Grade, marketed by Stauffer Chemical Company. The TEOS can be hydrolyzed by mixing together 100 parts by volume TEOS and 22 parts by volume 0.05 N hydrochloric acid solution. For each 244 mls of TEOS/HCL mixture, one drop of a suitable dye can be added, if desired. The dye, which can be any material which does not interfere with the hydrolyzed TEOS or the repair procedure, aids in the observation of homogenization or the "end point" for mixing the TEOS and the HCL solution. It also serves the purpose of indicating that a uniform layer of the hydrolized TEOS has been applied to the damaged substrate area. The "end point" referred to above is the point at which the mixture of the TEOS and HCL solution is clear, albeit tinted by the dye if used, there being no indication of stratification in the mixture on standing. Generally speaking, the end point is reached 30 to 45 minutes after the TEOS and HCL solutions have been mixed using a typical laboratory type mixer.

TEOS has been found to have the following characteristics particularly useful in repairing refractory materials, such as, LI-900 waterproofed, coated tiles.
 1. Low surface tension, easily applied and highly penetrating.
 2. Precipitation of pure silica when cured.
 3. Inherent adhesive nature of the precipitated silica provides a strengthened base (particularly at fiber intersections) and provides adhesive surface for the filler material.

The hydrolyzed TEOS can be applied using a brush, spray, or other suitable means which will provide a uniform, even coating of the damaged portion of the substrate. The paste filler can be applied using a spatula or other suitable tool which will permit the paste filler to be worked into all of the minute recesses of the cavity of the damaged area.

The curing can be accomplished by heat guns, heat lamps, etc., therefore making the procedure usable on the vehicle. The repair procedure has been used on LI-900 tiles, and the repairs have been proven unaffected by arc jet (600 sec; 2050°–2100° F.) or radiant thermal exposure cycling to 2300° F. Some repairs were made to tiles on a vertical tail acoustic test article for the shuttle and all survived the tests without change. The repair procedure was then used to repair numerous damaged tiles in situ on the NASA Space Shuttle Orbiter.

The repair method can be applied to vertical, overhead or face-up surfaces. Repairs like the tiles themselves will be subject to vibration and acoustic shock during lift-off, extreme temperature cycling during orbit and extremely high temperature during reentry. All repairs which were made to tiles on the space shuttle orbiter prior to its first mission were carefully checked after the first mission and it was found that they withstood the first flight without degradation. The procedure is being certified for standard repair of damaged tiles for multimission use.

The foregoing process has been directed primarily to the repair of waterproofed LI-900 tiles. However, it is equally applicable to tiles made in accordance with U.S. Pat. No. 3,952,083 and known as LI-2200 tiles and tiles made in accordance with U.S. Pat. No. 4,148,962 and known as FRCI tiles. Also, it may be used to repair other refractory units particularly when removal of the unit is prohibitive.

The foregoing disclosure and description of the invention is illustrative and explanatory thereof, and various changes in the method steps may be made within the scope of the appended claims without departing from the spirit of the invention.

We claim:
1. A method of repairing damage to a porous refractory material which may be coated with a glass coating comprising applying hydroylyzed tetraethyl orthosilicate to the damaged area, curing said hydrolyzed tetraethyl orthosilicate, applying to said damaged area a pliable filler comprised of hydrolyzed tetraethyl orthosilicate and powdered refractory substrate, and heating the damaged area to cure said filler.

2. The method of claim 1 wherein said filler includes a pigmenting agent.

3. The method of claim 2 wherein said pigmenting agent includes silicon tetraboride powder.

4. The method of claim 1 including wetting said damaged area with hydrolyzed tetraethyl orthosilicate prior to application of said filler.

5. The method of claim 1 including coating said repaired area with hydrolyzed tetraethyl orthosilicate following curing of said filler.

6. The method of claim 5 including curing said coating of said hydrolyzed tetraethyl orthosilicate on said repaired area.

7. The method of claim 1 wherein said filler comprises at least 60% by weight powdered refractory substrate, some amount, up to 10% by weight, of silicon tetraboride and hydrolyzed tetraethyl orthosilicate, said tetraethyl orthosilicate being present in an amount such that said filler does not sag under gravitational force.

8. The method of claim 1 wherein said glass coating comprises a borosilicate glass.

9. The method of claim 8 wherein said glass coating is pigmented to provide an optically absorptive surface.

10. The method of claim 1 wherein said hydrolyzed tetraethyl orthosilicate initially applied to said damaged area is cured at a temperature of about 275° F.

11. The method of claim 10 wherein said filler is dried at a temperature of about 120° F. prior to curing.

12. The method of claim 11 wherein said filler is cured, following drying, at a temperature of about 275° F.

13. The method of claim 1 wherein said damaged area is undercut around the periphery prior to being repaired.

14. The method of claim 1 including sanding the repaired area to the desired contour.

15. A method of in situ repair of damaged areas of thermal insulating tiles for a spacecraft, wherein the tiles are formed of substantially chemically pure silica fibers which are rigidized with a high purity silica binder, the tiles being waterproofed with a silane waterproofing agent and coated with a relatively thin layer of borosilicate glass, said method comprising: applying hydrolyzed tetraethyl orthosilicate to the damaged area, curing said hydrolyzed tetraethyl orthosilicate, wetting the damaged area with a second coating of hydrolyzed tetraethyl orthosilicate, applying a filler material to the damaged area, the filler material formed of approximately 60% by weight of fine silica fibers and hydrolyzed tetraethyl orthosilicate, the filler material completely filling the damaged area, curing the filler material, then matching the filler material to the surface of the tiles, and applying a waterproofing agent to the filler material.

* * * * *